United States Patent [19]

Bland et al.

[11] 4,055,791
[45] Oct. 25, 1977

[54] SELF COMMUTATED SCR POWER SUPPLY

[75] Inventors: Robert J. Bland, Berkeley Heights; Winfried Seipel, Califon, both of N.J.

[73] Assignee: Hewlett-Packard Company, Palo Alto, Calif.

[21] Appl. No.: 610,963

[22] Filed: Sept. 8, 1975

[51] Int. Cl.$^2$ .......................................... H02M 3/315
[52] U.S. Cl. ........................................ 363/28; 363/79; 363/96
[58] Field of Search ................... 321/2, 18, 19, 43, 44, 321/45

[56] References Cited

U.S. PATENT DOCUMENTS

| | | | |
|---|---|---|---|
| 3,303,406 | 2/1967 | Bedford | 321/45 R X |
| 3,305,794 | 2/1967 | Seelig | 321/45 R |
| 3,316,476 | 4/1967 | Olson et al. | 321/45 R |
| 3,351,779 | 11/1967 | Hehenkamp | 321/45 R |
| 3,406,327 | 10/1968 | Mapham et al. | 321/45 |
| 3,454,863 | 7/1969 | Hintz et al. | 321/44 |
| 3,543,130 | 11/1970 | Reijnders | 321/18 X |
| 3,835,364 | 9/1974 | Van Rooy | 321/45 R |
| 3,881,146 | 4/1975 | Wanlass | 321/2 |

Primary Examiner—William M. Shoop
Attorney, Agent, or Firm—Allston L. Jones; Stephen P. Fox

[57] ABSTRACT

A switching type power supply is provided which includes a first and a second SCR with a diode connected in reverse across each of them. The first SCR-diode pair in response to a clock pulse charges a capacitor which when fully charged causes the first SCR current to return to zero, forward biases the first diode and commutates the first SCR off for at least the required minimum turn-off time of the SCR. After the capacitor reaches the peak charge value, the second SCR is selectively triggered to couple the desired portion of the stored energy to the power supply load via a transformer. After the currents in the secondary windings of the transformer reverse, and the capacitor achieves a peak charge of the opposite polarity, the current through the second SCR becomes zero, the second diode is forward biased, and the second SCR is commutated off. Thus, in steady-state operation, the first and the second SCR's will conduct alternately during the charging and discharging times of the capacitor, respectively, during each cycle. Also included in the power supply is an auxiliary feedback path, in addition to the constant voltage and current control feedback paths, to suppress the oscillation of the power supply when a load with a reactive impedance is utilized.

5 Claims, 7 Drawing Figures

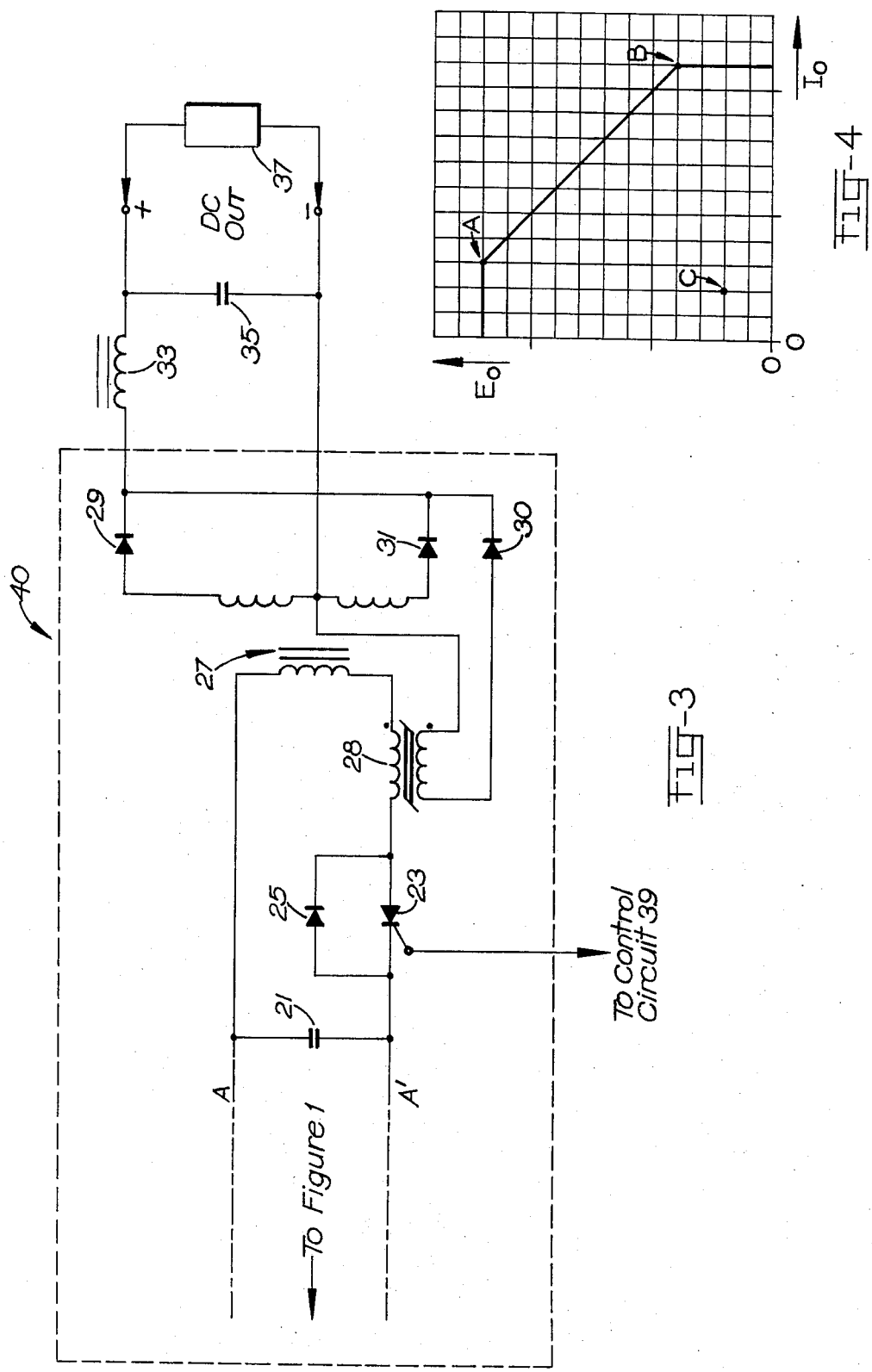

SELF COMMUTATED SCR POWER SUPPLY

BACKGROUND

This invention is concerned generally with switching power supplies and, more particularly, with a self-commutated SCR power supply that can supply maximum power over a wide range of output voltages and currents to a wide variety of load impedances, including loads having high reactive impedance components.

Switching power supplies, or D.C. to D.C. converters, have traditionally combined high efficiency with small size. One typical configuration of the prior art is the transformer coupled power supply having an A.C. input voltage that is rectified. The resulting D.C. voltage is applied to a switching device such as a transistor or an SCR for opening and closing the circuit to create an A.C. current through the primary of the transformer. The output of the secondary of the transformer is then rectified and filtered, using one or more stages of filtering with inductors and capacitors in a well known manner. Regulation is achieved by using an error signal from the output voltage, in constant voltage operation, or from the output current, in constant current operation, to control the duty cycle or frequency, or both, of the switching device. In these power supplies, it has been a problem to obtain both low ripple on the output power signal, and feedback stability when the power supply is operating into a load with a high reactive impedance component. The switching device is typically turning on and off under high current conditions resulting in high power losses in the switching device and inducing square wave power signals in the secondary of the transformer which are hard to filter out. The dissipation and drive requirements of currently available economical transistors for the switching device limits the practical power supply output power. SCR's are thus more desirable at the higher power levels but high ($di/dt$) through the SCR during switching and the need for extra SCR commutating circuitry reduces the usefulness of SCR's for the switching devices as well.

Various techniques were attempted in the prior art to extinguish the conduction of SCR switches and to control the power supplied to the load. Since SCR's require a fixed minimum turn-off time during which a forward bias voltage cannot be reapplied to the SCR without it becoming again conductive, various techniques of either forced reverse biasing of the SCR or resonating the SCR current to zero for a period at least as long as the required minimum SCR turn-off time were devised.

The Morgan circuit is a well known direct coupled SCR chopper inverter circuit that is single ended. In this circuit the SCR is self-commutated by an LC circuit which includes a saturable reactor. When the reactor saturates, the SCR rings off with high switching losses and RFI since the SCR is carrying a full load current during ringing off. Also, load energy limits are not provided by this circuit so that for a large load current the LC resonant circuit will not have enough energy to ring off the SCR, and, in order to vary the power level of the D.C. output power signal, this circuit requires that the SCR trigger frequency vary for different loads. This type of power output control is called a time-ratio control, which necessitates operating the SCR in the audible frequency range to vary the power supply output signal over a useful range.

Another SCR power circuit of the prior art is a voltage doubler with a fixed output voltage as discussed in the paper by J. A. Pirraglia and R. Kande entitled "A 15 KC-DC to DC Converter," and printed in the IEEE Conv. Record of the Industrial Static Power Converter Conf., No. 4, Nov. 1965, pp.2224–233. This circuit employs the natural resonance of two capacitor coupled loops as the means of energy transfer and SCR commutation. The current through the SCR's being nearly sinusoidal provides for low initial $di/dt$ and switching losses of each SCR. Also, diode clamping of a capacitor common to both loops limits the energy that may be transferred through the resonant loops. Without the diode clamp the voltage on the unclamped capacitor would attain an uncontrolled level. Additionally, no capability for varying the output power is provided in this circuit; however, by varying the frequency of the SCR trigger pulses, the output power can be varied, which necessitates operating the SCR in the audible frequency range, and creates variable frequency RFI which is difficult to eliminate with fixed filters.

Yet another type of self-commutated power supply is described by Patrick W. Clarke in a paper entitled "Self-Commutated Thyristor D.C. to D.C. Converter," and presented at the IEEE Workshop on Applied Magnetics, Washington, D.C., May 22–23, 1969. In this circuit an LC resonant circuit is used to commutate a pair of SCR's. The inductances of this resonant circuit are contributed by the primary windings of a coupling transformer which also isolates the load from the input circuit. The voltage on the output capacitor is reflected back to the input side of the transformer and causes each of the SCR's in turn to abruptly clamp off, resulting in high $di/dt$ switching losses, and RFI on the output signal. By providing a minimum load across the output capacitor, the voltage across the capacitor is prevented from charging to greater than twice the input voltage. Without this minimum load, the output energy is limited only by the Q of the circuit. In this circuit, like those described above, the output power can only be varied by a time-ratio control technique for triggering each of the SCR's.

As mentioned previously, the prior art power supplies typically regulate the output signal by feeding back an error signal from either the output voltage when in the constant voltage mode, or the output current when in the constant current mode to control the duty cycle or frequency of operation, or both, of the switching device. The stability of these control loops becomes a problem when a large reactive load is placed on the power supply. A power supply in the constant current mode loaded with an inductor or in the constant voltage mode loaded with a capacitor results in the inclusion of an additional pole in the respective feedback loop, causing an additional phase shift that can cause the control loop to oscillate. It is well known that if a circuit with a loop gain of greater than unity experiences a phase shift of 180° in the feedback loop, it will oscillate, thus, the greater the reactive impedance of the load, the greater the possibility of oscillation. To prevent power supply oscillation, the feedback loops of the prior art power supplies were either unable to tolerate loads with large reactive impedance components or were tailored to the specific load to prevent oscillations.

SUMMARY OF THE INVENTION

The present invention provides a switching power supply with the capability of operating at a constant frequency above the audible frequency range, operating over a wide range of output voltage and current, and powering any load including a load with a large reactive impedance while eliminating many of the problems of the devices known in the prior art. In accordance with the illustrated preferred embodiment, the invention uses a first switching device, such as an SCR, with a first diode connected in reverse across it. This first switching device, after being triggered by a fixed frequency clock, couples energy from an input signal to a resonant circuit where the energy charges a capacitor. When the voltage on this capacitor reaches the peak value determined by the frequency of the resonant circuit, the current through the first switching device returns to zero and the voltage stored on the capacitor forward biases the first diode resonantly commutating off the first switching device. At least a portion of the charge on the capacitor is discharged through the first diode with the resonant circuit frequency being selected to maintain forward bias on the first diode for a period at least as long as the minimum required turn-off time for the first switching device.

A second switching device-diode combination is provided to transfer a selected portion of the energy stored on the capacitor to the primary winding of the transformer by selectively triggering the second switching device after the first diode becomes forward biased. The energy transferred to the primary of the transformer is then coupled to the split secondary windings where the resulting power signal is rectified to provide the desired D.C. power output signal.

When the capacitor voltage discharges to zero and the currents in the secondary windings of the transformer reverse, the energy stored in the magnetic field of the transformer forces the transformer primary current to continue in the same direction, and thereby causes the capacitor to resonantly charge in the reverse direction. This resonant circuit includes the capacitor and the magnetizing inductance of the primary winding of the transformer. The current through the second switching device continues until the energy stored on the capacitor peaks negatively at which time the second diode is forward biased commutating off the second switching device. The second diode remains forward biased until the negative charge on the capacitor is dissipated during the resonant period of the capacitor and the magnetizing inductance of the primary winding of the transformer which is selected so that this resonant period is at least as long as the minimum required turn-off time of the second switching device.

Thus, in steady-state operation, the first and second switching devices will conduct alternately during the charging and discharging times of the capacitor, respectively, of each cycle. This circuit configuration also provides for turning on the first switching device into a low current to minimize switching losses and RFI in the D.C. power output signal experienced by the prior art. To reduce the switching losses and RFI introduced by the second switching device, a saturable transformer is placed in series with the second switching device in a second embodiment of the invention.

The feedback loop of the present invention includes an auxiliary feedback path in addition to the constant voltage and current control paths of the prior art. The auxiliary feedback path includes an operational amplifier that monitors both the D.C. output voltage and current having a frequency response that is matched to the frequency response of each of the two control paths and having a gain for each of the output signals which is substantially attenuated from the gain of the corresponding signal control path. The output signal of the auxiliary feedback path is then added to the signal from the control path that is associated with the controlling output signal. This composite signal is then applied to a comparator where the signal is compared to a ramp voltage signal to trigger the second switching device at the proper time to couple the selected energy level of the capacitor to the transformer for providing the desired D.C. power output signals within a present tolerance.

With the auxiliary feedback path, the present invention is not susceptible to oscillation when loaded with a passive resistive, reactive, or complex load impedance. Also, by the proper selection of the gains of each of the three feedback paths, it is possible to make the open loop gain of the feedback path independent of the load impedance.

DESCRIPTION OF THE DRAWINGS

FIG. 3 is a schematic representation of another embodiment of the invention in which additional details of the power circuit are included.

FIG. 4 is a graphical representation of the rated output voltage versus current of the power supply of the present invention.

DESCRIPTION OF THE PREFERRED EMBODIMENT

Figure 1:
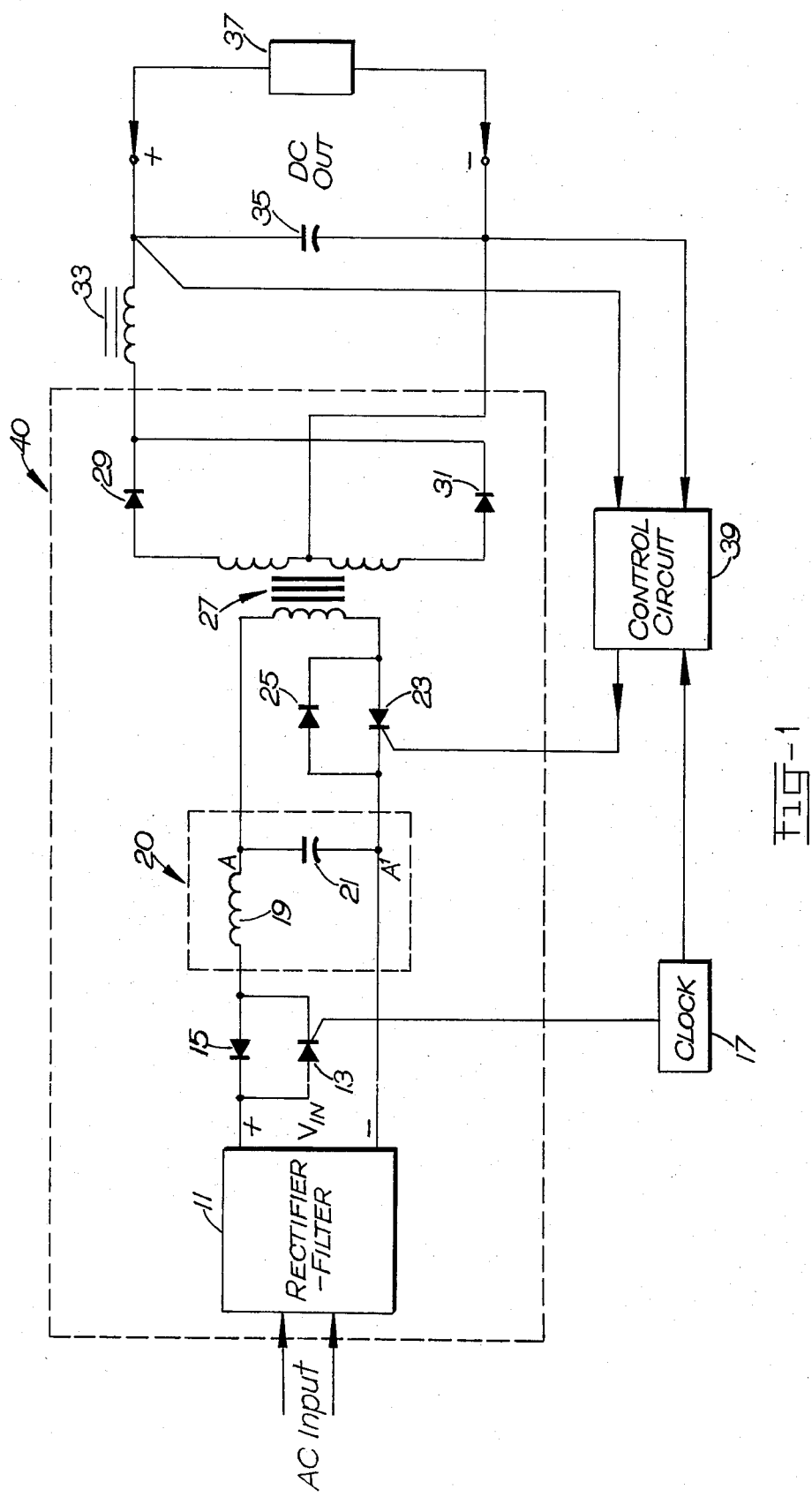
FIG. 1 is a schematic representation of the one embodiment of the invention in which the details of the power circuit are included.

In FIG. 1 there is shown an input rectifier/filter circuit 11 which produces a D.C. voltage, $V_{in}$, from an A.C. input voltage. The D.C. voltage $V_{in}$ is supplied to the anode of SCR 13 and to the cathode of diode 15 which are connected in reverse parallel across each other. The gate of SCR 13 is driven by the output signal of a fixed frequency clock 17. The cathode of SCR 13 is in turn connected to an LC resonant circuit 20 including an inductor 19 and a capacitor 21. Resonant circuit 20 limits the maximum energy available to a load 37 on the power supply while also assisting with commutation off of SCR 13 to produce a minimum of switching losses and RFI. A second SCR 23 and a diode 25 are also connected in reverse parallel to conduct the desired portion of the energy stored on capacitor 21 to establish the magnetic field of the primary of transformer 27 in response to control circuit 39. The A.C. power signal coupled to the split secondary windings of transformer 27 is rectified by diodes 29 and 31. The resultant rectified power signal is then filtered by inductor 33 and capacitor 35 before being applied to load 37. The circuit of FIG. 1 less clock 17, control circuit 39, and the output filter which includes inductor 33 and capacitor 35 can also be called the power mesh 40 of the power supply.

Figure 2:
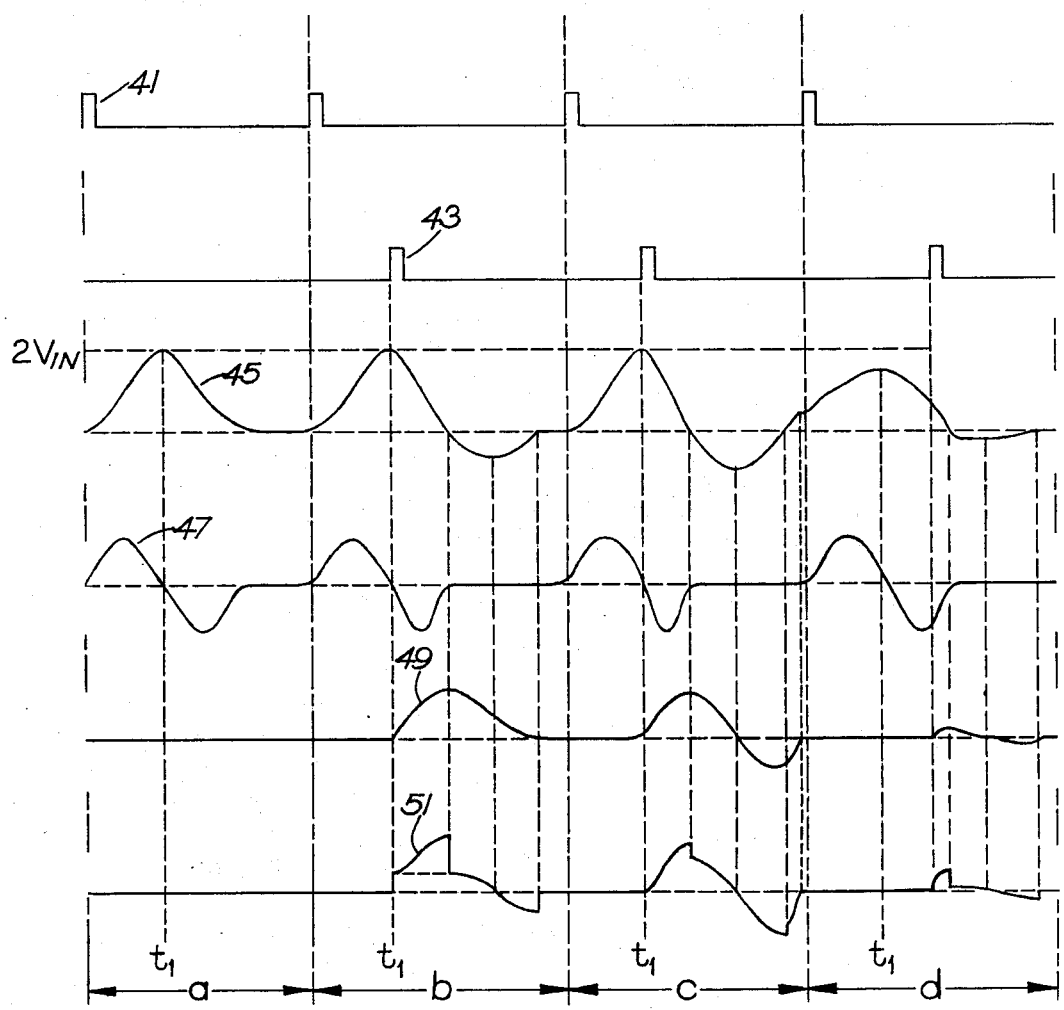
FIGS. 2a through d are a series of representations of selected voltage and current waveforms of the power supply under several different load conditions.

The operation of the primary side of the power supply circuit can be best understood with reference to the waveforms of FIG. 2. Each of the several waveforms in FIG. 2 represent one of various voltages or currents of the power supply for each of several load conditions. Waveform 41 represents the fixed frequency pulse train from clock 17 to trigger SCR 13, and waveform 43 represents the trigger pulses of SCR 23 from control circuit 39. The next waveform, i.e., waveform 45, represents the voltage charge on capacitor 21, and waveform 47 represents the current through inductor 19 where the positive going portions of this waveform represent the current through SCR 13 and the negative going portions represent the current through diode 15. Waveform 49 represents the magnetizing current in the primary winding of transformer 27. The last waveform, i.e., waveform 51, is a composite waveform where the positive going portions represent the current through SCR 23 and the negative going portions represent the current through diode 25. The waveforms of FIG. 2a represent selected voltages and currents of the power supply when SCR 23 is not triggered and no power is transferred to the secondary winding of transformer 27. The waveforms of FIGS. 2b, 2c and 2d represent the same voltages and currents as in FIG. 2a when the power supply load conditions are as shown by points B, A and C, respectively, in FIG. 4.

When SCR 13 is triggered by the fixed repetition rate pulse (waveform 41) from clock 17, SCR 13 turns on into zero current (waveform 47) and capacitor 21 charges to a maximum of $2V_{in}$ volts (waveform 45) from the nearly sinusoidal SCR 13 current (waveform 47). The sinusoidal nature of the SCR 13 current is the result of applying the D.C. voltage $V_{in}$ to the uncharged resonant circuit 20 via SCR 13. At time $t_1$, capacitor 21 is fully charged and the SCR 13 current (waveform 47) becomes zero with SCR 13 ceasing to conduct current. Now diode 15 becomes forward biased by the difference between the voltage on capacitor 21 and $V_{in}$. If SCR 23 is not triggered, the voltage charge on capacitor 21 resonantly decays to zero through inductor 19 and diode 15 leaving the circuit uncharged until the next pulse from clock 17 (waveform 41) after reverse biasing SCR 13 for a period longer than the minimum required turn-off time of SCR 13.

The area under the negative sloping portion of waveform 45 of FIG 2a represents the energy that is available to be transferred to the secondary side of transformer 27. By varying the time after $t_1$ within the same clock period that the trigger pulse (waveform 43) is applied to SCR, the amount of energy transferred to the secondary winding of transformer 27 can be varied from approximately one hundred to zero percent. Upon being triggered, SCR 23 conducts the residual magnetizing current of transformer 27 and the load current reflected to the primary winding of transformer 27 (waveform 51). As the magnetization current of the primary winding of transformer 27 (waveform 49) increases, SCR 23 conducts this current in addition to the reflected load current. When the voltage on capacitor 21 becomes zero, the stored energy associated with the primary winding inductance of transformer 27 acts as an energy source, and as the voltage on capacitor 21 (waveform 45) passes through zero, the current through the secondary winding of transformer 27 reverses to conduct the load current through the other half of the secondary winding. As a result of the secondary winding current reversal, the current through SCR 23 is now the difference between the load current reflected to the primary side of transformer 27 and the magnetization current of the primary winding of transformer 27 (waveform 51). When the voltage on capacitor 21 (waveform 45) reaches the maximum negative value, the current through SCR 23 (waveform 51) is zero, turning SCR 23 off. Now, diode 25 begins to conduct and back biases SCR 23 while discharging capacitor 21 through the primary winding of transformer 27. The diode 25 current (waveform 51) supplied by the charge on capacitor 21 includes the reflected load current from the transformer secondary winding while driving the magnetic current of the transformer primary winding inductance current toward zero. When the voltage on capacitor 21 (waveform 45) reaches zero for the power supply load conditions of FIGS. 2b and 2d, the residual energy stored in the primary winding of transformer 27 is reduced to a level which cannot overcome the currents flowing in both halves of the secondary winding of transformer 27, because the magnetic energy stored in inductor 33 forces the load current to continue. Thus, the voltage on capacitor 21 remains zero for the remainder of the cycle. Under any load condition the residual energy stored in transformer 27 is retained in the magnetic field until SCR 23 is triggered during a following cycle. If the transformer primary winding magnetizing current (waveform 49 of FIG 2c) is large enough in the negative direction to overcome the load current that is reflected to the primary side of transformer 27 when the charge on capacitor 21 reaches zero volts, capacitor 21 will be slightly recharged positively (waveform 45) through diode 25 until the transformer primary winding magnetization current is no longer able to overcome the reflected load current. A similar recharging of capacitor 21 by a positive magnetizing current, resulting from the residual energy stored in transformer 27, cannot occur since SCR 23 is non-conducting and no path exists for such a current.

It can be seen that this circuit demonstrates a technique for commutating SCR 3 13 and 23 off softly, i.e., without large switching transients, when the current conducted by them is zero, and holds them off with diodes 15 and 25, respectively, for a period of at least the minimum required turn-off time of the particular SCR, without interrupting the power flow to load 37. Further, turn-on of SCR 13 is also accomplished with a small change in the rate of change of the SCR current with a nearly sinusoidal SCR current (waveform 47). These factors provide for low switching loss and minimal RFI on the D.C. power output signal and the A.C. input signal. The fixed repetition rate of the SCR 13 triggering establishes the minimum steady-state switching frequency or repetition rate of any power supply signal, and by selecting SCR's with turn-off times of up to 7 $\mu$ seconds, which are commercially available, a clock 17 frequency which is above the audible frequency range, e.g., 20 KHz, is possible.

In FIG. 3 there is shown a portion of the power supply circuit as shown in FIG. 1 to the right of nodes A and A' with the addition of a saturable transformer 28 and a diode 30. The three dots to the left of the nodes A and A' in FIG. 3 are meant to indicate that the circuit elements shown in FIG. 1 to the left of nodes A and A' are to be included in the circuit shown in FIG. 3. The saturable reactor winding, i.e., the primary winding, of saturable transformer 28 is connected serially between the primary winding of transformer 27 and the reverse parallel combination of SCR 23 and diode 25 with the dotted end connected to transformer 27. The secondary winding of saturable transformer 28 is in phase with the primary winding and is connected with the dotted end connected to the center tap of the secondary winding of transformer 27. The undotted end of the secondary winding of saturable transformer 28 is connected to the anode of diode 30, and the cathode of diode 30 is connected to the node at which diodes 29 and 31 and inductor 33 are connected.

In this circuit, the saturable reactor winding of transformer 28 is initially unsaturated when SCR 23 is triggered on. Immediately after SCR 23 is triggered on, most of the voltage charge on capacitor 21 appears across the saturable reactor winding of transformer 28, limiting the $di/dt$ into which SCR 23 turns on. After a fixed period of time, e.g., $0.5\mu$ seconds, the current through the saturable reactor winding of transformer 28 drives it into saturation allowing larger currents to flow through SCR 23 after conduction is established. The overall operation of the power supply proceeds as described for the circuit shown in FIG. 1 until the current through the saturable reactor winding of transformer 28 approaches zero and SCR 23 is commutated off. At that instant, the voltage charge on capacitor 21 reaches the peak negative value and through transformer action this peak negative voltage of capacitor 21 is applied to inductor 33 through diode 30. As the current in the saturable reactor winding of transformer 28 approaches zero, transformer 28 becomes unsaturated, and a large portion of the voltage charge on capacitor 21 appears across reactor 28 removing that voltage from the primary winding of transformer 27. The use of a saturable reactor in place of saturable transformer 28 would cause a large notch in the power signal applied to inductor 33, thereby decreasing the output power and increasing the timing of the resonant circuit on the primary side of transformer 27, both of which are undesirable. By the use of diode 30 and transformer 28, this potential notch in the signal applied to inductor 33 is eliminated by diode 30 being forward biased at this time and supplying the necessary power to inductor 33 to fill the potential notch in the output power from the energy stored in transformer 28. Transformer 28 again become saturated after the stored energy is discharged, diode 30 is again reversed biased, and the remainder of the power transfer cycle is as described above for the circuit shown in FIG. 1.

The addition of transformer 28 and diode 30 thus makes it possible to turn SCR 23 on into a very low $di/dt$, further minimizing the switching losses of SCR 23 and RFI on the D.C. power output signal. Once SCR 23 is fully conducting, saturable transformer 28 goes into saturation and a high current appears through SCR 23 without inducing RFI or other losses. The addition of transformer 28 and diode 30 and the resultant changes in circuit operation do not result in any significant changes in the waveforms as shown in FIGS. 2a through d.

The area under the curve of FIG 4 shows a typical output voltage versus current operating range of this type of power supply. The maximum voltage and current limitations are necessary to protect the power supply components from over voltage or current failures. The power limitations represented by the line between points A and B is related to the maximum energy stored on capacitor 21 that can be coupled to the power supply load.

Figure 5:
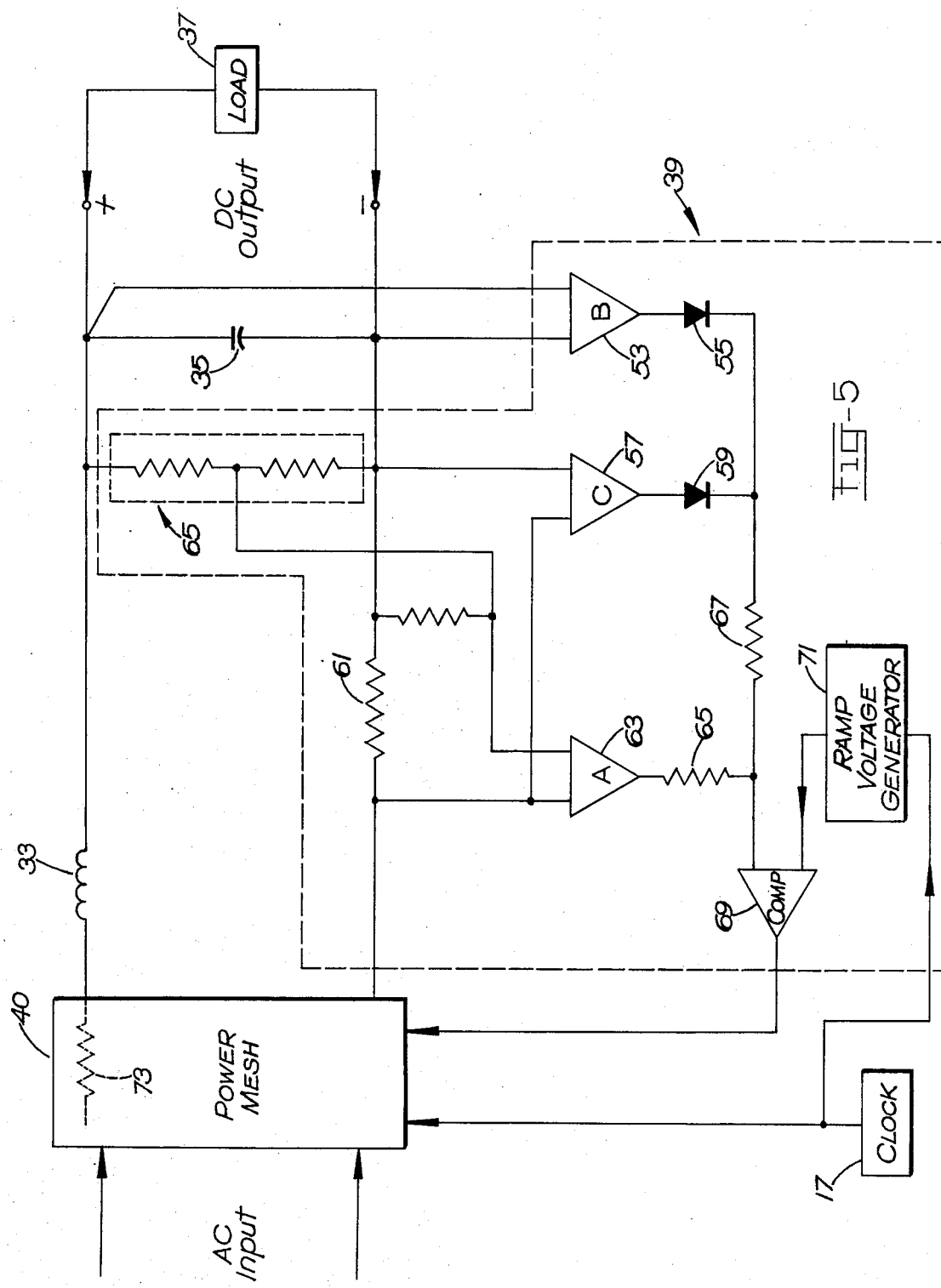
FIG. 5 is a schematic representation of the invention in which the major details of the feedback control circuits are included.

A simplified control circuit 39 is shown in FIG. 5 with two feedback paths to control the output voltage and current and an auxiliary feedback path to prevent the power supply from going into oscillation when load 37 has a large reactive impedance component. Each of these paths includes an operational amplifier, and each amplifier in turn includes conventional reference and feedback circuits (not shown). The output voltage feedback path includes an operational amplifier 53 responsive to the output voltage of the power supply with diode 55 connected serially with the output of amplifier 53. The voltage feedback path is operational when the power supply is in the constant voltage mode to maintain that output voltage within a preset tolerance. Similarly, the output current feedback path includes an operational amplifier 57 with the input connected across an output current sensing resistor 61, and diode 59 connected serially with the output of amplifier 57. The current feedback path is operational when the power supply is in the constant current mode to maintain that output current within a preset tolerance. These two control feedback paths are thus complementary with only one supplying a feedback control error signal at any one time, in the conventional manner.

To prevent the power supply from oscillating when the impedance of load 37 has a large reactive impedance component, i.e., a large phase angle approaching $\pm$ 90°, the circuit of the present invention includes the auxiliary feedback path to add to the feedback control error signal a second error signal which is responsive to the output current and voltage when the power supply is in either of the constant voltage or current modes. The auxiliary feedback path includes an operational amplifier 63 with the input connected across the output current sensing resistor 61 and to a voltage divider 65 that is across the power supply output. These connections provide an input signal to amplifier 63 that is a summation of two voltage signals that are representative of fractions of the output current and voltage. The output error signal of the auxiliary feedback loop is added to the feedback control error signal from either the current or the voltage control path through resistors 65 and 67, and is then applied to one input of a comparator 69. The comparator 69 then compares the composite feedback error signal voltage with the signal voltage from a ramp voltage generator 71 to trigger SCR 23 of power mesh 40 at the proper time to couple the desired energy from capacitor 21 to load 37. Ramp voltage generator 71 and comparator 69 can be implemented by any conventional technique.

Assuming that load 37 has a large inductive impedance component and the power supply is in the constant current mode, the prior art power supplies will oscillate at approximately the resonant frequency of load 37 with capacitor 35. Since the resonant load presents an infinite impedance across the output terminals of the power supply, the current through resistor 61 is zero and there is no feedback signal, thus causing the load to oscillate. With addition of the auxiliary feedback path, a fraction of the large output voltage is amplified by amplifier 63 to maintain the composite feedback error signal to comparator 69 above the 0 db loop gain level so that the feedback loop does not oscillate.

It is well known that the phase shift of a feedback loop with a greater than unity gain must remain negative and not experience a phase shift of 180° or more to prevent oscilation. With the addition of the auxiliary feedback path, the control circuit 39 will remain stable for any passive load 37. It is also possible to make the open feedback loop gain independent of the impedance of load 37 by selecting the gains of amplifiers 53, 57, and 63, and the value of the output sensing resistor 61 such that $R_{61} < R_{73}$, $(A/B)R_{61} = R_{73}$, and $(C/\beta A)R_{61} = R_{73}$ where
- $R_{61}$ is the value of current sensing resistor 61,
- $R_{73}$ is the value of the equivalent output resistance of power mesh 40,
- A, B, and C are the gains of amplifiers 63, 53 and 57, respectively, and
- $\beta$ is the fraction of the power supply output voltage coupled to the input of amplifier 63 from voltage divider 65, with $0 < \beta \leq 1$.

In addition, for the feedback control paths to provide the necessary D.C. regulation of the output voltage and current with a selected output transient response of the power supply, the dominant factor in the composite feedback error signal must be contributed by the output control path associated with the operational mode of the power supply, i.e., the constant voltage or current mode. The dominance by the control path in each operational mode of the power supply is insured by compensating the auxiliary amplifier 63 by any of several well-known techniques, such that the gain rolls off with increasing frequency at the same rate as the gain roll off of amplifiers 53 and 57. The magnitude of the gain of auxiliary amplifier 63 is, in practice, set 20 db or more below the gain levels of control amplifiers 53 and 57 to provide the desired circuit regulation.

Control circuit 39 with or without comparator 69 and ramp voltage generator 71, can also be used with different power mesh configurations and output filtering or regulation circuits.

Figure 6A:
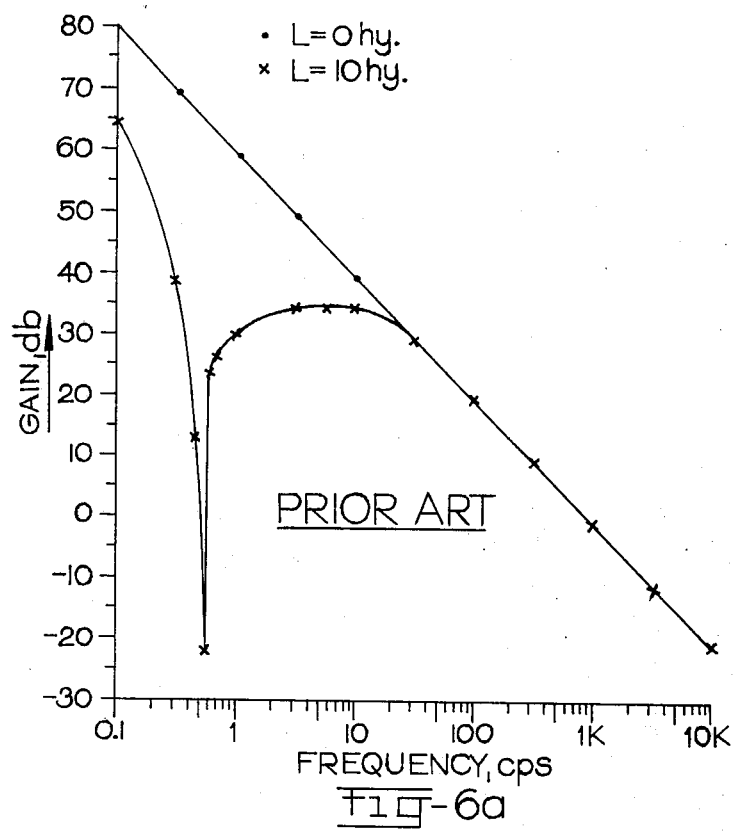
FIGS. 6a and b are graphical representations of the open loop gain versus frequency for two different inductive impedance loads for power supplies of the prior art and the present invention respectively.
Figure 6B:
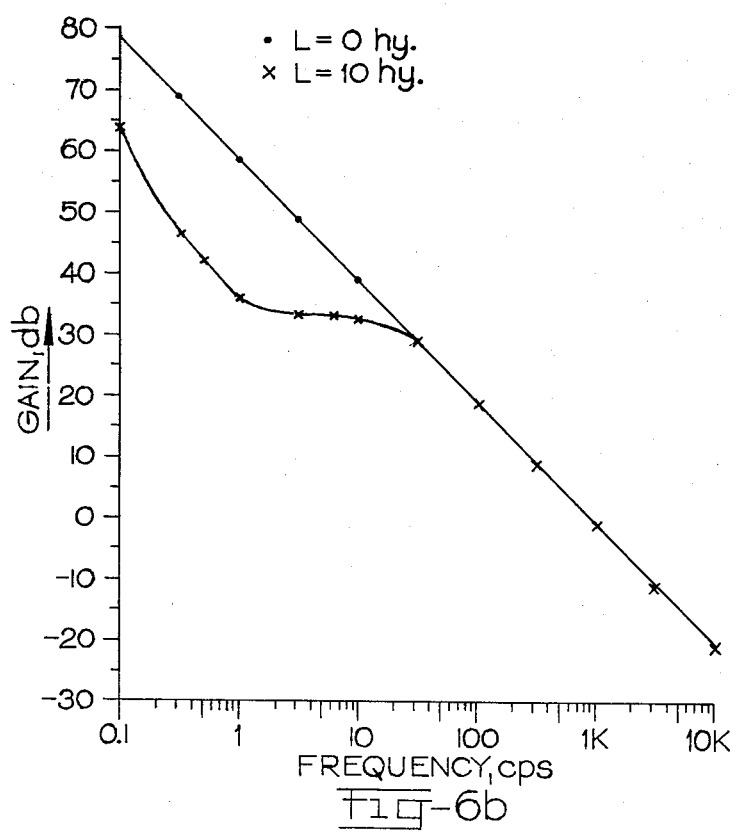

FIGS. 6a and b show the open loop gain versus frequency of the prior art and the present invention power supplies, respectively, for a 0 henry, i.e., short circuit, and a 10 henry power supply load while operating in the constant current mode. In the vicinity of the resonance frequency for the prior art power supply with a 10 henry load, it can be seen in FIG. 6a that the slope of the gain curve is greater than 40 db/decade indicating that the phase shift of the feedback loop is greater than 180° and that the feedback loop is oscillatory. In FIG. 6b, however, the gain curve for the power supply of the present invention with a 10 henry load experiences a roll off of less than 40 db/decade in the vicinity of the load resonant frequency and thus the feedback path does not oscillate.

We claim:

1. An apparatus for producing a regulated D.C. power signal comprising:
    a pair of input terminals for receiving an input signal; and
    power mesh means coupled to the input terminals for producing a selected D.C. power signal, wherein said power mesh means includes:
    input and energy storage means coupled to the input terminals for storing energy from the input terminals;
    transformer means coupled to the input and energy storage means and having input and output windings;
    switching means coupled to the input windings of said transformer means to selectively transfer a portion of the energy stored by the input and energy storage means to the transformer means; and
    output rectifying means coupled to the output windings of the transformer means for rectifying the output signal from said transformer means;
    a saturable transformer having a primary winding connected between the input winding of said transformer means and said switching means, and having a secondary winding with one end connected to a tap on the output winding of said transformer means; and
    a diode having an anode connected to the other end of the secondary winding of the saturable transformer, and a cathode connected to the common coupling point of said output rectifying means.

2. The apparatus for producing a regulated D.C. power signal as in claim 1 wherein:
    the primary of said saturable transformer minimizes the rate of change of the turn-on current to the switching means until said saturable transformer becomes saturated, and minimizes the switching losses and RFI created in the output power signal; and
    the combination of said saturable transformer and said diode being operative to provide output power when the saturable transformer becomes unsaturated limiting the current through the primary winding of said transformer means.

3. An apparatus for producing a regulated D.C. power signal comprising:
    a pair of input terminals for receiving an input signal;
    power mesh means coupled to the input terminals for producing a selected D.C. power signal; and
    feedback control means coupled to receive the selected D.C. power signal for regulating said selected D.C. power signal by selectively triggering the power mesh means to maintain the selected D.C. power signal within a preset tolerance, wherein said feedback control means includes:
    constant voltage control means coupled to receive the selected D.C. power voltage of said power mesh means for developing a feedback voltage error signal therefrom to regulate this voltage within a preset tolerance of the selected level when the power mesh means is operating in the constant voltage mode;
    constant current control means coupled to receive the selected D.C. power current of said power mesh means for developing a feedback current error signal therefrom to regulate this current within a preset tolerance of the selected level when the power mesh means is operating in the constant current mode;
    auxiliary feedback means having a frequency response matched to the frequency response of the two control means for monitoring both the selected voltage and the selected current to develop a composite feedback error signal including:
    a first error signal responsive to the controlling one of said selected D.C. power voltage signal and selected D.C. power current signal and attenuated relative to said one signal; and
    a second error signal responsive to the non-controlling one of said selected D.C. power voltage signal and selected D.C. power current signal;
    feedback error signal adding means coupled to the two control means and the auxiliary feedback means for adding the feedback error signal from the control means coupled to the controlling one of said selected D.C. power voltage signal and selected D.C. power current signal and the feedback error signal from the auxiliary feedback means;

ramp voltage generator means responsive to a fixed frequency pulse from the power mesh means for generating a ramp voltage signal; and comparator means coupled to the feedback error signal adding means and the ramp voltage generator means for selectively triggering the the power mesh means to maintain the selected D.C. power signal at the selected level.

4. The apparatus for producing a regulated D.C. power signal as in claim 3 wherein the auxiliary feedback means comprises:

a voltage divider means connected across said output filtering means;

a current sensing resistor connected to receive therethrough the D.C. power output current signal of said output filtering means; and an operational amplifier coupled to the voltage divider means and the current sensing resistor to receive a composite voltage signal responsive to both the D.C. power output voltage signal and the D.C. power output current signal.

5. An apparatus for producing a regulated D.C. power signal comprising:

a pair of input terminals for receiving an input signal;

power mesh means coupled to the input terminals for producing a selected D.C. power signal;

output power signal regulating means coupled to the power mesh means for regulating the selected D.C. power signal;

constant voltage control means coupled to receive the D.C. power output voltage of said output power signal regulating means for developing a feedback voltage error signal therefrom to control the output voltage within a preset tolerance of the selected level when the output power signal regulating means is operating in the constant voltage mode;

constant current control means coupled to receive the D.C. power output current of said output power signal regulating means for developing a feedback current error signal therefrom to control the output current within a preset tolerance of the selected level when the output power signal regulating means is operating in the constant current mode;

auxiliary feedback means having a frequency response matched to the frequency response of the two control means for monitoring both the D.C. power output voltage and the output current signals to develop a composite feedback error signal including:

a first error signal responsive to the controlling one of said D.C. power output voltage signal and D.C. power output current signal and attenuated relative to said one signal; and a second error signal responsive to the non-controlling one of said D.C. power output voltage signal and D.C. power output current signal; and feedback error signal adding means coupled to the two control means and the auxiliary feedback means for adding the feedback error signal from the control means coupled to the controlling one of said D.C. power output voltage signal and D.C. power output current signal and the feedback error signal from the auxiliary feedback means to form a composite error signal and for applying the composite signal to the output power signal regulating means to produce and maintain the selected D.C. power output signal at the selected level.

* * * * *

UNITED STATES PATENT AND TRADEMARK OFFICE
CERTIFICATE OF CORRECTION

PATENT NO. : 4,055,791

DATED : October 25, 1977

INVENTOR(S) : Robert J. Bland and Winfried Seipel

It is certified that error appears in the above-identified patent and that said Letters Patent are hereby corrected as shown below:

Column 5, line 49, after "SCR" insert -- 23 --;

Column 6, line 38, delete "SCR3" and insert -- SCR's --;

Column 7, line 25, delete "30" and insert -- 31 --;

Column 7, line 41, delete "become" and insert -- becomes --;

Signed and Sealed this

Twenty-eighth Day of March 1978

[SEAL]

Attest:

RUTH C. MASON
Attesting Officer

LUTRELLE F. PARKER
Acting Commissioner of Patents and Trademarks